United States Patent [19]

Haraguchi

[11] 3,936,846
[45] Feb. 3, 1976

[54] BATTERY MAGAZINE IN SINGLE LENS REFLEX CAMERA

[75] Inventor: Keisuke Haraguchi, Kamifukuoka, Japan

[73] Assignee: Asahi Kogaku Kogyo Kabushiki Kaisha, Tokyo, Japan

[22] Filed: Apr. 5, 1974

[21] Appl. No.: 458,146

[30] Foreign Application Priority Data
Apr. 9, 1973 Japan............................ 48-42629
Apr. 9, 1973 Japan............................ 48-42630

[52] U.S. Cl............................. 354/152; 354/173
[51] Int. Cl.²................................ G03B 19/12
[58] Field of Search........... 354/152, 153, 154, 155, 354/156, 173

[56] References Cited
UNITED STATES PATENTS

| | | |
|---|---|---|
| 2,552,275 | 5/1951 | Harvey............................ 354/156 |
| 2,969,722 | 1/1961 | Schwartz.......................... 354/173 |
| 3,138,080 | 6/1964 | Jacobson.......................... 354/173 |
| 3,608,460 | 9/1971 | Shimomura.................... 354/152 X |

*Primary Examiner*—L. T. Hix
*Assistant Examiner*—E. M. O'Connor
*Attorney, Agent, or Firm*—Wolder & Gross

[57] ABSTRACT

A single lens reflex camera houses a battery magazine which is disposed outside the swing path of the camera mirror and is accessible through the mount opening for an interchangeable objective. A cover is swingable between magazine open and closed positions along a path intercepting the mirror swing path and an interlock mechanism locks the cover in closed position when the mirror is in its viewing position and in one form locks the mirror in its photographing position when the cover is in open position.

7 Claims, 11 Drawing Figures

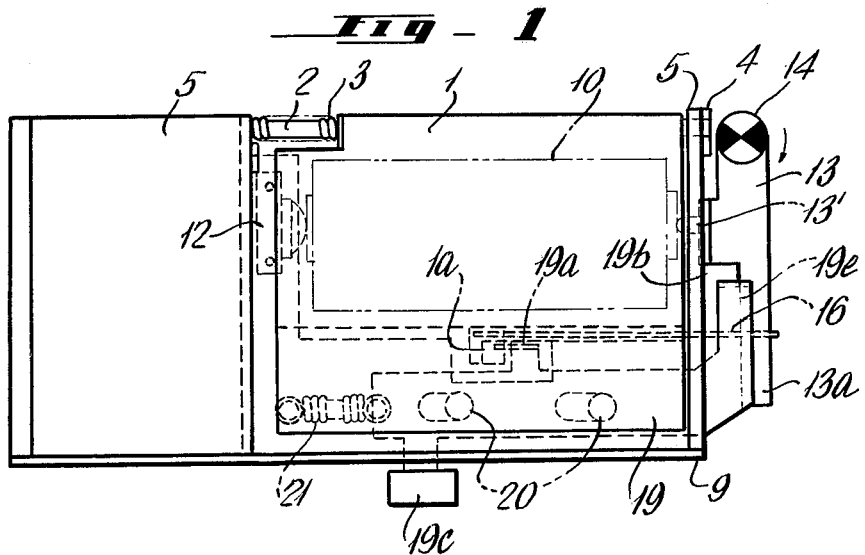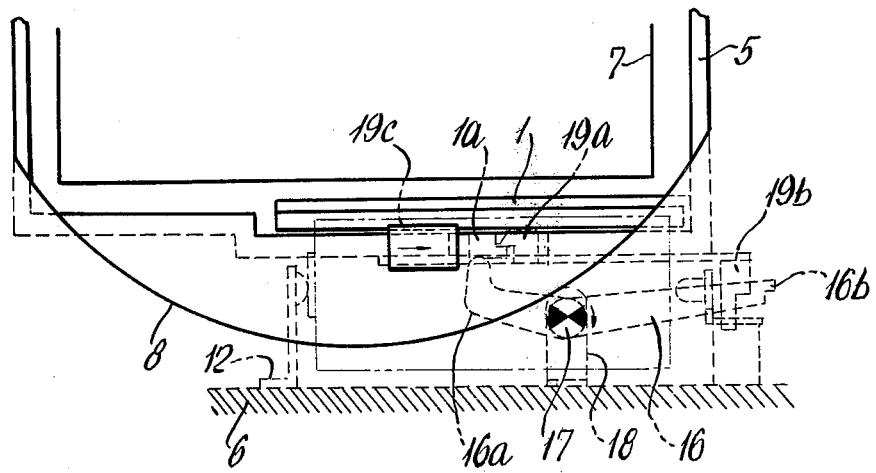

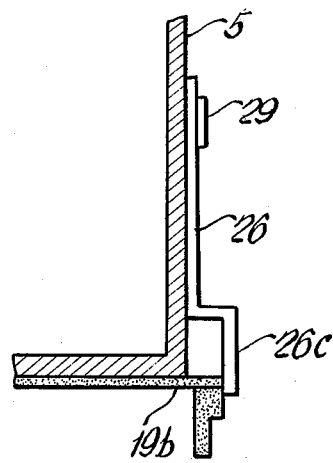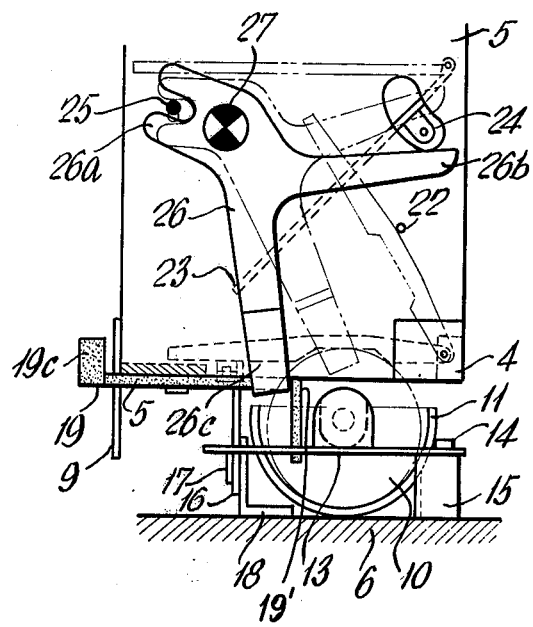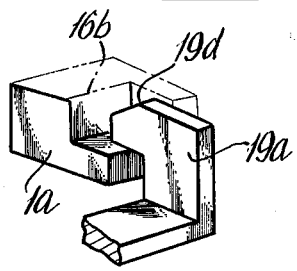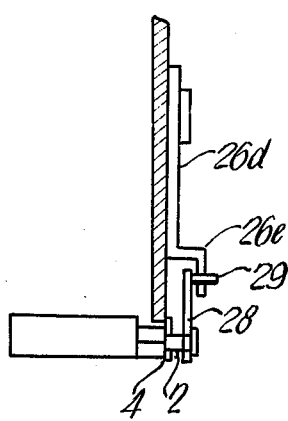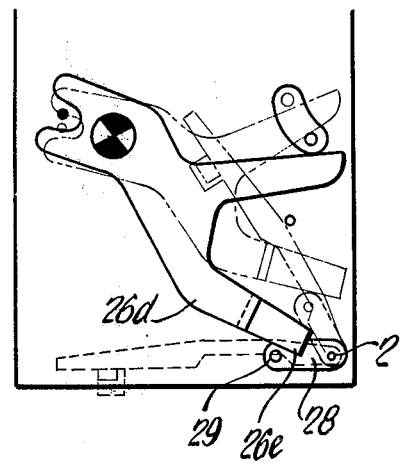

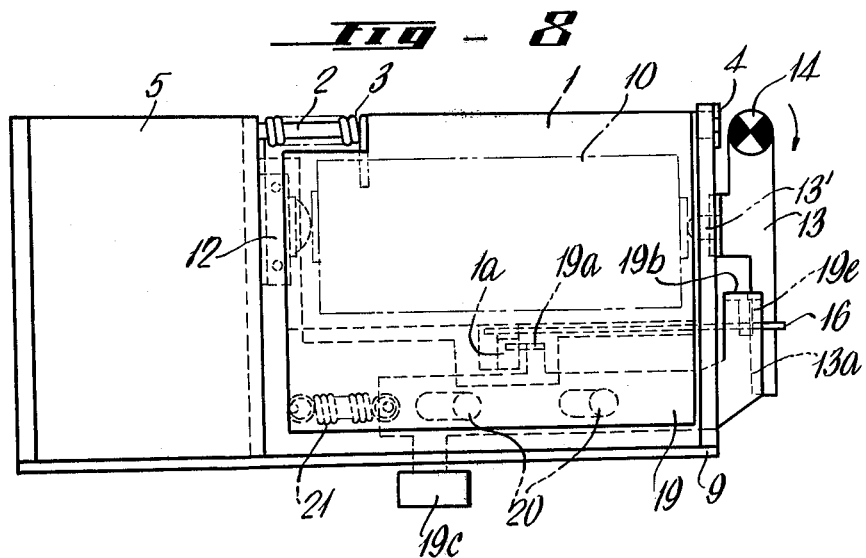
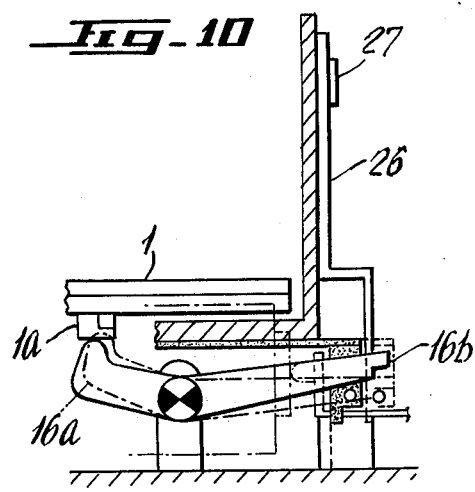
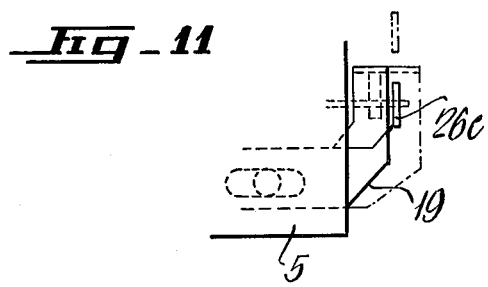
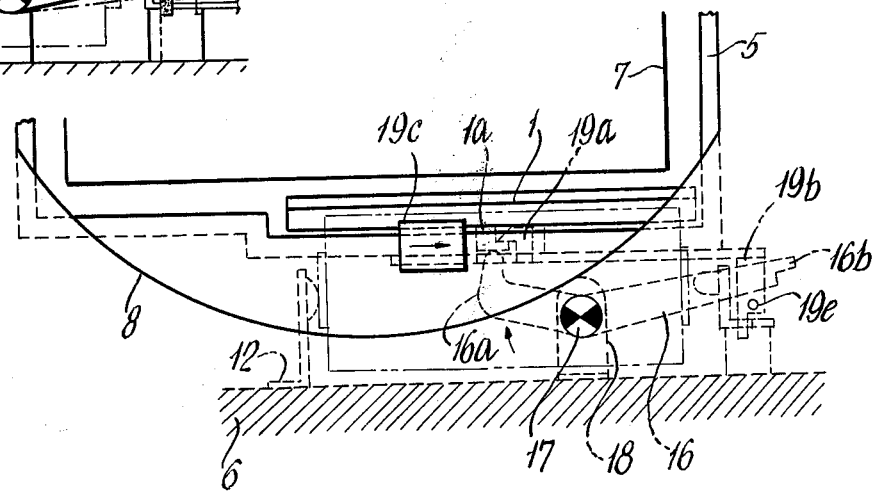

BATTERY MAGAZINE IN SINGLE LENS REFLEX CAMERA

BACKGROUND OF THE INVENTION

The present invention relates generally to improvements in battery housing cameras and it relates more particularly to an improved single lens reflex camera provided with electrically actuated devices in which the battery magazine is accessible through the opening in the interchangeable objective lens mount.

A battery is commonly employed in a single lens reflex camera for energizing various electrical components and devices associated with the camera. A convenient arrangement for housing such a battery in the camera is to position the magazine at a location in the camera body so as to be accessible for battery replacement through the opening in the interchangeable objective lens mount on the camera. However, the proper positioning of the battery magazine in the camera, particularly when such magazine is provided with a magazine cover and its operation and manipulation are difficult and inconvenient and are accompanied by the high possibility of damage to the camera mechanism.

SUMMARY OF THE INVENTION

It is a principal object of the present invention to provide an improved single lens reflex camera.

Another object of the present invention is to provide an improved single lens reflex camera having self contained battery energized components and devices.

Still another object of the present invention is to provide an improved signle lens reflex camera having a battery magazine accessible through the opening in the camera interchangeable objective lens mount.

A further object of the present invention is to provide a camera battery magazine of the above nature characterized by its reliability, use and convenience of operation without possible damage to the camera mechanism operation and its great versatility and adaptability.

The above and other objects of the present invention will become apparent from a reading of the following description taken in conjunction with the accompanying drawings which illustrate preferred embodiments thereof.

In a sense, the present invention contemplates the provision of a single lens reflex camera in which a battery magazine is located in the camera outside of the path of the camera mirror as it swings between its raised photographing retracted and lowered viewing advanced positions. The magazine is provided with a cover plate pivotably mounted on the camera body so that it can be opened for replacement of the batteries only when the mirror is in its raised position so as not to be brought into contact with the mirror. The mirror is also advantageously arranged so that it cannot be swung down when the cover plate is in the open position. For this purpose an interlocking mechanism is provided between the mirror and cover plate so that the cover cannot be opened when the mirror is in the lowered position and advantageously the mirror cannot be swung down when the cover plate is in the open position.

With the improved battery magazine mechanism the batteries housed in a single lens reflex camera may be rapidly and conveniently replaced through the objective lens mount opening without interferring with or damaging the camera mirror or any of the other camera mechanisms and the magazine mechanism is reliable and highly adaptable.

BRIEF DESCRIPTION OF THE DRAWINGS

FIG. 1 is a plan view of a battery magazine embodying the present invention and shown in its camera mounted position;

FIG. 2 is a front elevational view thereof;

FIG. 3 is a side elevational view thereof;

FIG. 4 is a detailed partial front elevational view of a portion thereof;

FIG. 5 is a fragmentary enlarged perspective view of the magazine cover locking mechanism;

FIG. 6 is a partial side elevational view of another embodiment of the present invention;

FIG. 7 is a partial front elevational view of a portion thereof;

FIG. 8 is a view similar to FIG. 1 of a further embodiment of the present invention;

FIG. 9 is a view thereof similar to FIG. 2;

FIG. 10 is a partial front elevational view thereof; and

FIG. 11 is a fragmentary top plan view of a portion thereof.

DESCRIPTION OF THE PREFERRED EMBODIMENTS

Referring now to the drawings, particularly FIGS. 1 to 5 thereof which illustrate a preferred embodiment of the present invention, a magazine cover plate 1 provided with a projection 1a is pivoted for swinging between raised open and lowered closed positions on a shaft 2 which is rotatably supported at one end by a portion of the mirror box 5 and at the other end by a bearing 4 mounted on the camera box 6. The cover plate 1 is biased to swing upwardly to an open advanced position by a spring 3 and is also urged by the spring 3 toward the bearing 4. The drawings also indicate at 7 an aperture which is in oppositon to the film, at 8 a lens mount, at 9 a face plate arranged forwardly of the magazine and at 10 a battery which is accommodated in a battery case 11 mounted in the camera box 6. A fixed contact 12 is located in opposition to the battery 10, and a movable contact plate 13 resiliently urges the battery 10 against the fixed contact 12, the movable contact plate 13 carrying a movable contact 13' and being spring biased to swing in a clockwise direction as viewed in FIG. 1 (in the direction of arrow) on the shaft 14 located on a projection 15 formed on the camera box 6 to thereby resiliently retain the battery 10 embraced between the movable contact 13' and the fixed contact 12. On the free end of the movable contact plate 13 is formed an extension portion 13a which is in opposition to a bent projection 19b on an actuating plate 19, (which will be hereinafter described,) and to the notched end 16b of an arrester or latch lever 16. The other end 16a of the arrester lever 16 is located in opposition to the face of the projection 1a of the cover plate 1. The arrester lever 16 is rockably supported by a shaft 17 so that it is pivotable clockwise as viewed in FIG. 2. The shaft 17 is mounted on a bracket 18 which, in turn, is mounted on the camera box 6. The actuating plate 19 has an end side edge 19', as best seen in FIG. 3, and is provided with a hook portion 19a, the bent projection 19b and a knob 19c. The hook portion 19a is so arranged as to engage a recess 1b formed in the projection 1a on the cover plate 1. The hook portion 19a can be brought into engagement with the recess 1b when the plate 19 is shifted along guide pins 20 by the action of a spring 21. On the top of the hook portion 19a is formed a cam defining inclined edge 19d which is engaged by the projection 1a when the cover plate 1 is closed to thereby shift the hook portion 19a together with the plate 19 until the hook portion 19a drops into the recess 1b. By shifting the operation plate 19 to the right in opposition to the influence of spring 21, the bent projection 19b moves the movable contact 13 counter-clockwise as viewed in FIG. 1, so that the extension portion 13a is brought to a retracted position where it is engaged by the notch in the notched end 16b of the arrester lever 16 to releasably retain the contact plate 13. A stop 22 is located on the side of the mirror box 5 so that it is in opposition to the cover plate 1. A mirror 23 is provided with a pin 24 which is integral with the mirror and a mirror raising pin 25 serves also to hold the mirror in its swung-up photographing retracted position. An arrester member or mirror retracting or raising lever 26 pivoted on a shaft 27 mounted on the side of the mirror box is provided with a fork end 26a engaging the operation pin 25. The arrester member 26 also has an arm 26b associated with the pin 24, and an arresting bent portion 26c extending downwardly so that it is in opposition to the edge of the operation lever 19. When it is in the position illustrated by the solid line in FIG. 3 the arrester member 26 prevents the shift of the operation plate 19, while in the position shown by broken line the arrester member 26 releases the plate 19 for operation. As explained above, the swinging movement area of the cover plate 1 is partly overlapped by the swinging movement area of the mirror 23 so that it is essential to maintain a constant relation between operations of the cover plate 1 and the mirror 23.

In the operation of the device having the foregoing construction, the knob 19c is shifted in the arrow direction (FIG. 2) with the lens detached from the lens mount 8. However, when the mirror 23 is in its advanced swung-down position or normal viewing or reflecting position, the arresting bent portion 26c of the lever 26 is in the position where it prevents the shift of the operation plate 19 as shown by the full line in FIG. 3, so that the operation plate 19 cannot be shifted. On the other hand, when the mirror is in its retracted or swung up position, the arresting bent portion 26b is retracted from the arresting position so that the operation plate 19 can be shifted. Upon shifting released plate 19 to the right, the hook portion 19a of the operation plate 19 disengages the recess 1b formed in the cover projection 1a and and as a result, the cover plate 1 is swung up to an advanced open position by the action of the spring 3 and retracts the projection 1a from engagement with the arrester lever 16. Accordingly, the arrester lever 16 swings clockwise as viewed in FIG. 2 on the shaft 17, so that the notched end 16b is moved to engage the movable contact plate 13 which is swung by the shifting of the operation plate 19 and releasably locks the movable contact plate 13 in a retracted position. Under these conditions, when the knob 19c is released, the cover plate 1 remains opened and the movable contact plate 13 remains in its open retracted position. After replacing the batteries the cover plate 1 is closed and the arrester lever 16 is swung counter-clockwise by the projection 1a so that the movable contact plate 13 is released and the hook portion 19a drops into the recess 1b formed in the projection 1a. In the operation described above, contact between the mirror and the cover plate is eliminated by controlling the shifting movement of the operation plate by means of the mirror raising lever 26 which acts also as an arrester member and is associated with the pin 25 which serves to hold the mirror in its raised photographing retracted position.

Although the foregoing description is directed to a construction where the shifting movement of the operation plate 19 is controlled by the mirror retracting lever 26, the embodiment shown in FIGS. 6 and 7 is so constructed as to directly lock the cover plate 1. Specifically, an interlocking lever 28 is fixed to the shaft 2 for the cover plate 1 so as to concurrently swing with the cover plate 1. The interlocking lever 28 has a pin 29 projecting therefrom. In opposition to pin 29 there is arranged, in place of the arresting bent end 26c of the mirror-up lever 26, an arresting bent end 26e of a curved arm 26d in opposition to the pin 29 so that the cover plate 1 is restrained directly by the pin 29 and interlocking lever 28 when the mirror is in its advanced or lowered position.

The operation plate 19 can be controlled by the provision of a movable contact plate 13 which is in association with the swinging up and down movement of the cover plate 1.

In FIGS. 8 to 11 of the drawings there is illustrated another embodiment of the present invention which further functions to prevent the advance of the mirror from its raised retracted position when the magazine cover is in its open position. The mechanism shown in FIGS. 7 to 10 is substantially similar to that shown in FIGS. 1 to 4 with the same reference numerals designating similar elements performing correspondingly similar functions. In addition, the bent projection 19b carries an outwardly projecting pin 19e which is in opposition to the notched end 16b of the lever 16.

The operation of the mechanism last described except as hereinafter explained, is similar to that of the mechanism first described. Moreover, when the cover plate 1 is in its open position the mirror-up lever 26 is prevented from returning by the end side edge 19' which is best seen in FIG. 3 and has the bent projection 19b, so that the mirror advancing operation cannot be effected. After replacing the batteries when the cover plate 1 is closed, the arrester lever 16 is moved in the opposite direction by the projection 1a so that the pin 19e is released, the operation plate 19 and movable contact plate 13 return and the hook portion 19a drops into the recess 1b formed in the projection 1a. Under these conditions since the interlocking lever 26 returns to the position shown in FIG. 3 by full line, then the mirror becomes freely operable, but the operation plate 19 cannot be shifted.

It will be appreciated from the foregoing that according to this invention, the cover plate can be opened only when the mirror is in its raised or retracted position. Furthermore, according to another feature, the mirror can be advanced only when the cover plate is in its closed position. In other words, by the provision of an interlocking mechanism having the above-described type of construction, any danger that the mirror and the battery magazine cover plate are brought into contact with each other is eliminated. Although the interlocking mechanism has been shown and described as to be arranged between the member for operating the cover plate and the member for holding the mirror in the swung-up position, it may also be arranged between the cover plate and the member for holding the mirror.

While there have been described and illustrated preferred embodiments of the present invention, it is apparent that numerous alterations, additions and omissions may be made without departing from the spirit thereof.

I claim:

1. In a single lens reflex camera including a camera body and a separable objective providing an access opening into said body upon detachment thereof and a mirror member movable along a predetermined path between a viewing, advanced position and a photographing retracted position, a battery accommodating magazine disposed in said body out of the path of said mirror member and accessible through said opening, and including a magazine cover member movable between a retracted magazine closing position and an advanced magazine open position along a path intercepting said mirror member predetermined path, and interlocking means responsive to the movement to an advanced position of one of said members for preventing the movement to an advanced position of the other of said members.

2. The camera of claim 1 wherein said interlocking means releasably locks said magazine cover member in its retracted position when said mirror member is in its viewing advanced position.

3. The camera of claim 2 wherein said interlocking means is responsive to the movement to the advanced position of said cover to releasably lock said mirror member in its photographing retracted position.

4. The camera of claim 2 wherein said interlocking means comprises a latching member movable between retracted and advanced positions respectively for locking said cover member in its retracted position and releasing said cover member for movements to its advance position and means responsive to the movement to the viewing advanced position of said mirror member for locking said latching member in its retracted position.

5. The camera of claim 4 wherein said interlocking means includes means relocking said mirror member in its photographing retracted position when said latching member is in its advanced position.

6. The camera of claim 2 wherein said interlocking means includes a first arm member movable with said cover member and a second arm member movable with said mirror member, a portion of said second arm member engaging a portion of said first arm member when said cover and mirror members are in their retracted and advanced positions respectively.

7. The camera of claim 1 wherein said mirror and cover members are swingable between their advanced and retracted positions.

* * * * *